(12) United States Patent
Razavi Majomard et al.

(10) Patent No.: US 11,509,509 B2
(45) Date of Patent: Nov. 22, 2022

(54) ENVIRONMENTALLY-AWARE RUN-TIME CONFIGURATION OF FILTERS IN A HIGH-SPEED DATA CHANNEL

(71) Applicant: Marvell Asia Pte, Ltd., Singapore (SG)

(72) Inventors: Seid Alireza Razavi Majomard, Belmont, CA (US); Mohit Singh, Milpitas, CA (US); Ramin Farjadrad, Los Altos, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/304,590

(22) Filed: Jun. 23, 2021

(65) Prior Publication Data

US 2021/0399927 A1 Dec. 23, 2021

Related U.S. Application Data

(60) Provisional application No. 63/124,534, filed on Dec. 11, 2020, provisional application No. 63/042,983, filed on Jun. 23, 2020.

(51) Int. Cl.
*H04L 25/03* (2006.01)

(52) U.S. Cl.
CPC .............................. *H04L 25/03885* (2013.01)

(58) Field of Classification Search
CPC .................................................. H04L 25/03885
See application file for complete search history.

(56) References Cited

U.S. PATENT DOCUMENTS

| | | | | |
|---|---|---|---|---|
| 2,021,018 A | * | 11/1935 | Eaton | G09F 1/00 248/459 |
| 3,386,168 A | | 2/1968 | Lucky | |
| 4,805,215 A | * | 2/1989 | Miller | H04B 3/23 370/290 |
| 7,446,622 B2 | * | 11/2008 | Chiang | H04B 3/04 333/28 R |
| 7,831,646 B1 | | 11/2010 | Lam et al. | |
| 9,137,056 B1 | * | 9/2015 | Spaete, Jr. | H04L 25/03019 |

(Continued)

FOREIGN PATENT DOCUMENTS

| | | |
|---|---|---|
| CA | 2 649 659 | 9/1999 |
| EP | 0 333 718 | 9/1989 |

OTHER PUBLICATIONS

Shen et al. U.S. Appl. No. 17/248,082, filed Jan. 8, 2021.

*Primary Examiner* — Freshteh N Aghdam (57) ABSTRACT

A physical layer transceiver, for connecting a host device to a wireline channel medium having a cable length, includes a host interface for coupling to a host device, a line interface for coupling to the channel medium, and filter circuitry operatively coupled to the line interface. The filter circuitry includes a plurality of filter segments, fewer in number than a total number of link segments in the cable length. Individual filter segments in the plurality of filter segments are configurable to correspond to individual link segments, and are separately controllable from other filter segments. Control circuitry detects a change of transmission conditions in a particular link segment, and upon detection of the change of transmission conditions, changes a configuration of one of the plurality of filter segments to cause an alteration in filtering of signals in the particular link segment at which the change of transmission conditions is detected.

23 Claims, 8 Drawing Sheets

(56) References Cited

U.S. PATENT DOCUMENTS

| | | | |
|---|---|---|---|
| 2001/0026197 A1* | 10/2001 | Tomisato | H04B 7/086 |
| | | | 333/28 R |
| 2003/0206579 A1* | 11/2003 | Bryant | H04L 25/03885 |
| | | | 379/406.01 |
| 2004/0179483 A1* | 9/2004 | Perlow | H04L 25/03057 |
| | | | 370/278 |
| 2005/0053129 A1* | 3/2005 | Yousef | H04L 25/03057 |
| | | | 375/233 |
| 2007/0133671 A1* | 6/2007 | Tsai | H03H 11/26 |
| | | | 375/233 |
| 2007/0280388 A1 | 12/2007 | Torre et al. | |
| 2013/0230092 A1 | 9/2013 | Prokop et al. | |
| 2013/0251019 A1 | 9/2013 | Kolze | |
| 2021/0218606 A1* | 7/2021 | Shen | H04L 25/03057 |
| 2022/0150093 A1* | 5/2022 | Dabak | H04B 3/32 |

* cited by examiner

ENVIRONMENTALLY-AWARE RUN-TIME CONFIGURATION OF FILTERS IN A HIGH-SPEED DATA CHANNEL

CROSS REFERENCE TO RELATED APPLICATIONS

This disclosure claims the benefit of, commonly-assigned U.S. Provisional Patent Applications Nos. 63/042,983, filed Jun. 23, 2020, and 63/124,534, filed Dec. 11, 2020, each of which is hereby incorporated by reference herein in its respective entirety.

FIELD OF USE

This disclosure relates to the configuration of filters for equalization of a high-speed data channel. More particularly, this disclosure relates to the adjustment of the configuration of filters in a high-speed data channel in response to environmental changes, during run-time, in the channel being filtered.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Physical layer (PHY) devices for high-speed wireline serial communications, such as 1000 Base-T or 10G Base-T lines, typically use adaptive filters for equalization, including cancellation of echo, crosstalk and/or radiofrequency (RF) interference. A typical adaptive filter may include feed-forward equalizer (FFE) circuitry, echo cancellation (EC) circuitry, near-end crosstalk (NEXT) cancellation circuitry, and/or far-end crosstalk (FEXT) cancellation circuitry. The adaptive filter may have a plurality of taps, with each tap covering a segment of the cancellation circuitry, corresponding to a respective segment of the wireline link. The coefficients of each segment are adapted with an algorithm such as, e.g., least-mean-squares, to maximize the effectiveness of the cancellation circuity. In typical cancellation scenarios, the crosstalk or echo points are limited along a particular cable. Therefore, in some implementations, filter segments are provided only for portions of the wireline link that experience crosstalk or echo. In some of those implementations, "rover" filters, which can be configured to cover different portions of the link using a programmable delay line, may be used. The rover filters may be configured during a training interval prior to run-time—i.e., before entering data mode—to filter link segments requiring equalization or other filtering. However, during run-time, if environmental conditions change, the number and/or location of link segments requiring equalization or other filtering may change. That is, the number of link segments requiring equalization or other filtering may increase or decrease, and even if the number remains the same, the locations of the link segments requiring equalization or other filtering may be different. In addition, the filtering requirements for segments that are being filtered may change.

SUMMARY

According to implementations of the subject matter of this disclosure, a physical layer transceiver, for connecting a host device to a wireline channel medium having a cable length, includes a host interface for coupling to a host device, a line interface for coupling to the wireline channel medium, and filter circuitry operatively coupled to the line interface. The filter circuitry includes a plurality of filter segments, fewer in number than a total number of link segments of the cable length of the wireline channel medium. Respective individual filter segments in the plurality of filter segments are configurable to correspond to respective individual link segments of the total number of link segments, and are separately controllable from other filter segments in the plurality of filter segments. The filter circuitry also includes control circuitry configured to detect a change of transmission conditions in a particular link segment of the total number of link segments, and upon detection of the change of transmission conditions in the particular link segment of the total number of link segments, change a configuration of one of the plurality of filter segments to cause an alteration in filtering of signals in the particular link segment at which the change of transmission conditions is detected.

In a first implementation of such a physical layer transceiver, the control circuitry may be configured to detect the change in transmission conditions in the particular link segment of the total number of link segments without using an active filter segment corresponding to the particular link segment of the total number of link segments or to an adjacent link segment of total number of link segments.

In a second implementation of such a physical layer transceiver, the plurality of filter segments, fewer in number than the total number of link segments, includes a plurality of rover filter segments each of which is selectably configurable to filter a respective link segment of the total number of link segments, and the control circuitry is configured to detect the change in transmission conditions in the particular link segment of the total number of link segments by selectively advancing an unused rover filter segment of the plurality of rover filter segments through the link segments, and to measure transmission conditions of each link segment of the total number of link segments as the unused rover filter segment passes through the link segments.

A third implementation of such a physical layer transceiver may include correlation circuitry configured to calculate a correlation between transmitted data and one or more errors in received data. The control circuitry may be configured to detect, from the correlation, the change in transmission conditions in the particular link segment of the total number of link segments.

In a fourth implementation of such a physical layer transceiver, the control circuitry may be configured to, upon detection of the change in transmission conditions in the particular segment of the total number of link segments, change the configuration of the one of the plurality of filter segments to cause the alteration in filtering of signals in the particular segment at which the change in transmission conditions is detected by adjusting output gain of the one of the plurality of filter segments.

According to a first aspect of that fourth implementation, the control circuitry may be configured to adjust output gain of the one of the plurality of filter segments by adding another filter segment in parallel with a current filter segment.

According to a second aspect of that fourth implementation, the control circuitry may be configured to adjust output gain of the one of the plurality of filter segments by substituting, for a current filter segment, another filter segment with a different gain.

In one instance of that second aspect, the plurality of filter segments, fewer in number than the total number of link segments, may include a plurality of rover filter segments, and the control circuitry may be configured to substitute, for a current rover filter segment, another filter segment with a different gain by advancing an unused one of the rover filter segments to filter the particular link segment of the total number of link segments, increasing gain of the unused one of the rover filter segments while decreasing gain of the current rover filter segment, and when gain of the current rover filter segment reaches zero, removing the current rover filter segment from its correspondence to the particular link segment of the total number of link segments.

In a fifth implementation of such a physical layer transceiver, the plurality of filter segments, fewer in number than the total number of link segments, may include a plurality of rover filter segments each of which is selectably configurable to filter a respective link segment of the total number of link segments, and the control circuitry may be configured to, upon detection of the change in transmission conditions in the particular link segment of the total number of link segments, change the configuration of the one of the plurality of filter segments to cause the alteration in filtering of signals in the particular link segment at which the change in transmission conditions is detected by advancing an unused one of the rover filter segments to filter the particular link segment of the total number of link segments.

According to a sixth implementation of such a physical layer transceiver, the plurality of filter segments, fewer in number than the total number of link segments, may include a plurality of rover filter segments each of which is selectably configurable to filter a respective link segment of the total number of link segments, and the control circuitry may be configured to, upon detection of the interference event in the particular link segment of the total number of link segments, change the configuration of the one of the plurality of filter segments to cause the alteration in filtering of signals in the particular link segment at which the change in transmission conditions is detected by removing one of the rover filter segments that filters the particular one of the plurality of link segments at which the change in transmission conditions is detected from its position filtering the particular link segment of the total number of link segments.

In accordance with implementations of the subject matter of this disclosure, where a wireline channel medium has a cable length, and has filter circuitry including a plurality of filter segments, fewer in number than a total number of link segments of the cable length of the wireline channel medium, each filter segment in the plurality of filter segments being selectably configurable to correspond to one link segment of the total number of link segments, and being separately controllable from each other filter segment in the plurality of filter segments, a method of filtering the wireline channel medium includes detecting a change in transmission conditions in a particular link segment of the total number of link segments, and upon detection of the change in transmission conditions in the particular link segment of the total number of link segments, changing a configuration of one of the plurality of filter segments to cause an alteration in filtering of signals in the particular segment of the total number of segments of the cable length of the wireline channel medium.

In a first implementation of such a method, detecting the change in transmission conditions in the particular link segment of the total number of link segments may be performed without using an active filter segment corresponding or adjacent to the particular segment of the total number of segments of the cable length of the wireline channel medium.

In a second implementation of such a method, where the plurality of filter segments, fewer in number than the total number of segments of the cable length of the wireline channel medium, includes a plurality of rover filter segments each of which is selectably configurable to filter a respective link segment of the total number of link segments, detecting the change in transmission conditions in the particular link segment of the total number of link segments may include advancing an unused rover filter segment of the plurality of rover filter segments through the link segments of the wireline channel medium, and measuring conditions of each link segment of the wireline channel medium as the unused rover filter segment passes through the link segments of the wireline channel medium.

In a third implementation of such a method, where the filter circuitry includes correlation circuitry configured to calculate a correlation between transmitted data and one or more errors in received data, detecting the change in transmission conditions in the particular link segment of the total number of link segments may include detecting, from the correlation, the change in transmission conditions in the particular link segment of the total number of link segments of the wireline channel medium.

In a fourth implementation of such a method, changing the configuration of the one of the plurality of filter segments to cause the alteration in filtering of signals in the particular link segment of the total number of link segments may include adjusting output gain of the one of the plurality of filter segments.

According to a first aspect of that fourth implementation, adjusting the output gain of the one of the plurality of filter segments may include adding another filter segment in parallel with a current filter segment.

According to a second aspect of that fourth implementation, adjusting the output gain of the one of the plurality of filter segments may include substituting, for a current filter segment, another filter segment with a different gain.

According to a first instance of that second aspect, where the plurality of filter segments, fewer in number than the total number of link segments, includes a plurality of rover filter segments each of which is selectably configurable to filter a respective link segment of the total number of link segments, substituting, for a current filter segment, another filter segment with a different gain, includes advancing an unused one of the rover filter segments to filter the particular link segment of the total number of link segments, increasing gain of the unused one of the rover filter segments while decreasing gain of the current rover filter segment, and when gain of the current rover filter segment reaches zero, removing the current rover filter segment from its position corresponding to the particular link segment of the total number of link segments.

According to a fifth implementation of such a method, where the plurality of filter segments, fewer in number than the total number of link segments, includes a plurality of rover filter segments each of which is selectably configurable to filter a respective link segment of the total number of link segments, changing the configuration of one of the plurality of filter segments to cause the alteration in filtering of signals in the particular link segment of the total number of link segments may include advancing an unused one of the rover filter segments to filter the particular link segment of the total number of link segments.

According to a sixth implementation of such a method, where the plurality of filter segments, fewer in number than the total number of link segments, includes a plurality of rover filter segments each of which is selectably configurable to filter a respective link segment of the total number of link segments, changing the configuration of the one of the plurality of filter segments to cause the alteration in filtering of signals in the particular link segment of the total number of link segments may include removing one of the rover filter segments that filters the particular link segment of the total number of link segments from its position filtering the particular link segment of the total number of link segments.

According to implementations of the subject matter of this disclosure, where a wireline channel medium has a cable length, and has filter circuitry including a plurality of filter segments, fewer in number than a total number of link segments of the cable length of the wireline channel medium, each filter segment in the plurality of filter segments being selectably configurable to correspond to one link segment of the total number of link segments, and being separately controllable from each other filter segment in the plurality of filter segments, a method of filtering the wireline channel medium includes, for each filter segment location, examining whether filter coefficients of a current filter segment have an expected value and, when the filter coefficients have other than the expected value, substituting a new filter segment with a different dynamic range, to bring the filter coefficients to the expected value, and determining whether signal quality improves, when signal quality improves after substitution, retaining the new filter segment, and removing the current filter segment, when signal quality does not improve after substitution, retaining the current filter segment, and removing the new filter segment, and advancing to a next filter segment location.

According to a first implementation of such a method, determining whether signal quality improves may include measuring at least one of signal-to-noise ratio, bit error rate, and decoder workload.

According to implementations of the subject matter of this disclosure, a physical layer transceiver, for connecting a host device to a wireline channel medium having a cable length, includes a host interface for coupling to a host device, a line interface for coupling to the wireline channel medium, and filter circuitry operatively coupled to the line interface. The filter circuitry includes a channel filter configured to filter all of the cable length of the wireline channel medium, a plurality of additional filter segments, respective individual ones of the additional filter segments in the plurality of filter segments being configurable to correspond to respective individual link segments of the total number of link segments, and being separately controllable from other filter segments in the plurality of filter segments, and control circuitry configured to detect a change of transmission conditions in a particular link segment of the total number of link segments, and upon detection of the change of transmission conditions in the particular link segment of the total number of link segments, configure an individual one of the plurality of additional filter segments to correspond to, and to filter, the particular link segment at which the change of transmission conditions is detected.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As noted above, physical layer devices for high-speed wireline serial communications, such as 1000 Base-T or 10G Base-T lines, typically use adaptive filters for equalization, and for cancellation of echo, crosstalk and/or RF interference. A typical adaptive filter may include echo cancellation circuitry, near-end crosstalk cancellation circuitry, and/or far-end crosstalk cancellation circuitry. The adaptive filter may have a plurality of taps, with each tap covering a segment of the cancellation circuitry, corresponding to a respective segment of the wireline link. The coefficients of each segment are adapted with an algorithm such as, e.g., least-mean-squares, to maximize the effectiveness of the cancellation circuity. Therefore, in some implementations, filter segments are provided only for portions of the wireline link that experience crosstalk or echo. In some of those implementations, "rover" filters, which can be configured to cover different portions of the link using a programmable delay line, may be used. The rover filters may be configured during a training interval prior to run-time—i.e., before entering data mode during which data is exchanged between link partners—to filter those link segments requiring equalization or other filtering. However, during run-time, if environmental conditions change, the number and/or location of link segments requiring equalization or other filtering may change. That is, the number of link segments requiring equalization or other filtering may increase or decrease, and even if the number remains the same, the locations of the link segments requiring equalization or other filtering may be different. In addition, the filtering requirements for segments that are being filtered may change—e.g., the values of the filter coefficients at a segment may change. Moreover, because not every location has an active filter segment, the need for filtering may arise at a location at which there is not an active filter segment, and which does not have an active filter segment nearby, to detect the changed conditions requiring filtering.

For example, the wireline connection in question may be a fixed cable in a data center which is normally under stable conditions. Under those conditions, large portions of the cable may be free of interference, while segments near connectors are more susceptible to interference. In theory, then, it could be acceptable to provide filter segments only for link segments adjacent to cable connectors. However, during run-time, fluctuations in temperature, or physical movement ("cable shake") or bending (i.e., kinking) of the cable (e.g., by a technician working nearby) may change interference conditions on the cable to the point that it would be desirable to add filter taps or segments corresponding to portions of the cable link where those newly-arisen sources of interference occur. Additionally, changes in environmental conditions may eliminate the need for a filter segment corresponding to a particular link segment. Finally, required filter parameters (e.g., coefficients and/or gain) of filter segments, corresponding to a particular link segment that is already being filtered, may change, necessitating adjustment of those filter parameters. Without the ability to add or move filter taps during run-time, it could be necessary to shut down the wireline link altogether, so that it could be re-enabled with appropriate filter taps active in view of the current transmission conditions. Moreover, it might not be possible to detect the changed conditions if there is no active filter segment at or adjacent the location at which the changed conditions arise.

In another situation, the wireline connection in question may be an automotive Ethernet cable. If the cable is poorly or not properly secured to the vehicle, the cable may move (including possibly bending or kinking) as the vehicle accelerates or road surface conditions change. Moreover, the cable, along with the remainder of the vehicle, could be subject to large enough temperature variations—resulting, for example, from changing weather conditions and sun load—that formerly stable segments become subject to interference. In such a case, shutting down an automotive system to reconfigure the filters while a vehicle is being driven may not be feasible. Moreover, it might not be possible to detect the changed conditions if there is no active filter segment at or adjacent the location at which the changed conditions arise.

Therefore, in accordance with implementations of the subject matter of this disclosure, a physical layer transceiver for connecting a host device to a wireline channel medium having a cable length, is provided, in which the number of filter segments is smaller than the total number of link segments along the channel medium. Because at any one time only some of those link segments might need filtering, the smaller number of filter segments can be assigned as needed to link segments that need filtering, reducing unnecessary power consumption and conserving device area.

In addition to a host interface for coupling to the host device, a line interface for coupling to the wireline channel medium, and encoding/decoding circuitry operatively coupled to the host interface and the line interface for interfacing between the host device and the wireline channel medium, the physical layer transceiver includes adaptive filter circuitry operatively coupled to the encoding/decoding circuitry. The adaptive filter circuitry includes a plurality of filter segments, fewer in number than a total number of link segments of the cable length of the wireline channel medium. Respective individual filter segments in the plurality of filter segments are configurable to correspond to respective individual link segments of the total number of link segments. For example, the individual filter segments may be "rover" filter segments that can be "moved" along the length of the wireline channel medium to filter different link segments. The rover filter segments may not physically move, but rather the correspondence of any rover filter segment to a particular link segment may be adjusted, for example, using a programmable delay line. In addition to being "movable," the parameters of each individual filter segment may be separately controllable.

If a change in transmission conditions resulting from environmental changes is detected (as discussed below), the configuration of one of the filter segments can be changed to alter the filtering of signals at the particular link segment at which the change in transmission conditions has occurred.

In one scenario, the link segment at which a change in transmission conditions is detected could be a link segment not currently being filtered. In that scenario, a rover filter segment can be "moved" or advanced to correspond to the link segment requiring filtering by adjusting a programmable delay line.

In another scenario, the link segment at which a change in transmission conditions is detected could be a link segment that currently is being filtered, but no longer needs filtering. In that scenario, a rover filter segment that currently corresponds to that link segment can be "moved" or advanced by adjusting a programmable delay line, so that it no longer corresponds to that link segment, or the filter segment could be left in that location (e.g., if it is not needed in another location) but, to save power, can simply be deactivated by adjusting its gain and/or coefficients.

In a third scenario, the link segment at which a change in transmission conditions is detected could be a link segment that currently is being filtered, and still needs filtering, but the filter parameters (e.g., filter gain and/or coefficients) require adjustment. In some implementations, this scenario can be addressed by, rather than attempting to adjust a filter segment that is in operation, advancing a new filter segment to correspond to the link segment whose existing filter segment requires adjustment, and advancing the existing filter segment away from the link segment. In some such implementations, in order to prevent discontinuities in the transmission, gain of the new filter segment is gradually increased, while gain of the existing filter segment is gradually decreased, until the gain of the existing filter segment reaches zero and the existing filter segment can be advanced away from the link segment being filtered.

Generalizing from these scenarios, in rover filter implementations, a rover filter configuration may be adjusted without causing discontinuities in the signal. As used herein and in the claims which follow, "rover filter configuration" includes the number of active rover filter segments, the programmed delay for each rover filter segment (which determines its "position" relative to a link segment), and the output gain and/or coefficient values of each rover filter segment. The rover filter configuration may be changed by adding a new rover filter segment, removing an existing rover filter segment, or adjusting the gain of the existing rover filter segment (which may be achieved either by replacing the existing rover filter segment with another rover filter segment with different gain, or by adding another rover filter segment in parallel with the existing rover filter segment).

As noted above, before the rover configuration can be adjusted, the need for change based on a change in transmission conditions on the channel should be detected. In some implementations, such detection can be performed with traveling "auxiliary" rover, or by calculating correlation between the receive and transmit paths in the physical layer transceiver, both as described below.

Specifically, in an auxiliary rover filter implementation, an otherwise unused rover filter segment, which can be referred to as an auxiliary rover filter segment, can be "moved" through the link by continually adjusting the programmable delay line of the auxiliary rover filter segment. At each link segment location, the auxiliary rover filter segment is allowed to adapt and then a quality metric (such as the signal-to-noise ratio), bit error rate, or decoder workload) with the auxiliary rover filter segment present may be measured and compared to the same quality metric as measured before the auxiliary rover filter segment was added. If the quality metric improves when the auxiliary rover filter segment is present, a new rover filter segment (if there is no existing rover filter segment at that link segment location), or an adjusted rover filter segment (if there is an existing rover filter segment at that link segment location)—which could be a new rover filter segment with different gain than the existing rover filter segment, or could be the existing filter segment to which adjustments are made, or could be the unadjusted existing rover filter segment along with an additional rover filter segment in parallel with the existing rover filter segment—may be provided to that link segment location. This analysis could be generalized by considering the absence of an existing rover filter segment to be a type of existing rover filter segment, in which case adding a new rover filter segment and adjusting an existing rover filter segment can both be considered a form of adjustment of an existing rover filter segment. In any case, the use of a traveling auxiliary rover filter segment allows detection of changed transmission conditions, requiring filtering, even where there is no active filter segment at or adjacent the location at which the changed conditions arise.

In a correlation implementation, change in the channel transmit conditions may be detected by periodically performing a correlation operation between an uncorrected signal in the transmit path of the physical layer transceiver, and the slicer error in an echo-canceled signal in the receive path of the physical layer transceiver. The correlation would show the delay and magnitude of uncanceled echo or crosstalk. A rover filter segment may be added at locations where the uncanceled error, as shown by the correlation output, is larger than a predetermined threshold. As a confirmation check, SNR may be measured after adding the new rover filter segment at the location where uncanceled error is larger than a predetermined threshold. Only if SNR improves more than a predetermined amount would the new rover be kept at that location where uncanceled error is larger than a predetermined threshold. The use of correlation to detect locations requiring filtering allows detection of changed transmission conditions, requiring filtering, even where there is no active filter segment at or adjacent the location at which the changed conditions arise.

The subject matter of this disclosure may be better understood by reference to FIGS. 1-9.

Implementations of the subject matter of this disclosure may be found in the physical layer transceiver (PHY) of fixed, or "enterprise," Ethernet links, or in automotive or other mobile Ethernet links.

Figure 1:
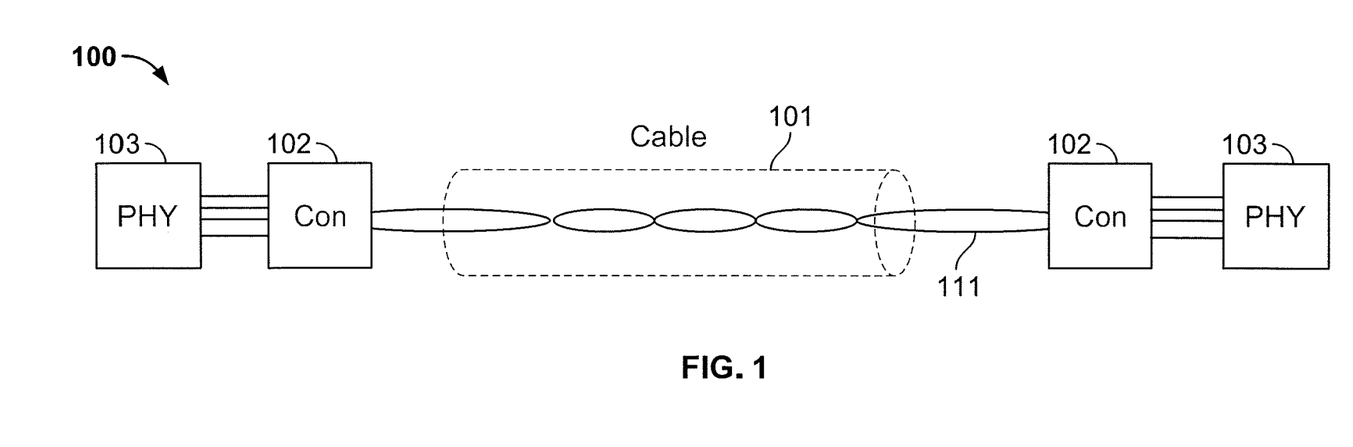
FIG. 1 is a representation of an Ethernet physical link, which may be an automotive Ethernet physical link, in which an implementation of the subject matter of this disclosure may be used.

An automotive Ethernet physical link 100 in which an implementation of the subject matter of this disclosure may be used is shown in FIG. 1, connecting two physical layer transceivers 103, one of which may be located in an electronic control unit (ECU) of a vehicle, and another of which may be located in a functional module of the vehicle. Each PHY 103 is connected via a respective connector 102 to channel medium 101 which, in this implementation, may be a cable including a single shielded or unshielded twisted copper wire pair 111, or a coaxial cable or optical fiber.

Figure 2:
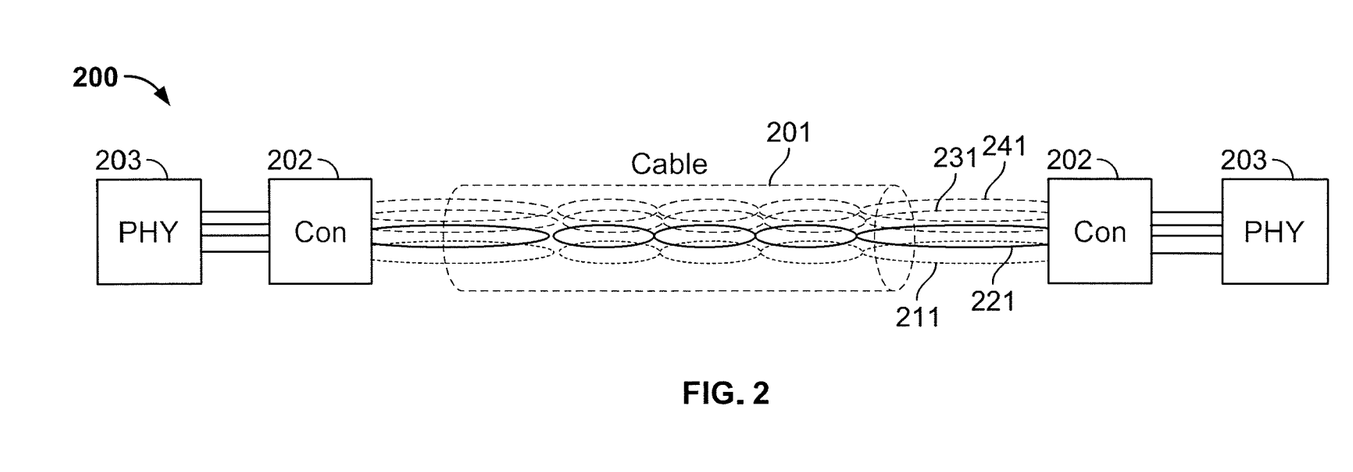
FIG. 2 is a representation of an Ethernet physical link, which may be an enterprise Ethernet physical link, in which an implementation of the subject matter of this disclosure may be used.

Although single-cable physical link 100 also may be used in enterprise implementations, an enterprise Ethernet physical link 200 in which an implementation of the subject matter of this disclosure may be used is shown in FIG. 2, connecting two physical layer transceivers 203 corresponding to respective link partners, each of which may be located in a respective data processing or storage device. Each PHY 203 is connected via a respective connector 202 to channel medium 201 which, in this implementation, is a cable that may include four shielded or unshielded twisted copper wire pairs 211, 221, 231, 241, or four coaxial cables or optical fibers, or a mix thereof.

From the perspective of this disclosure, PHYs 103 and PHYs 203 are identical in relevant respects. An implementation of a PHY 300, shown in FIG. 3, may be used as either PHY 103 or PHY 203, for example.

Figure 3:
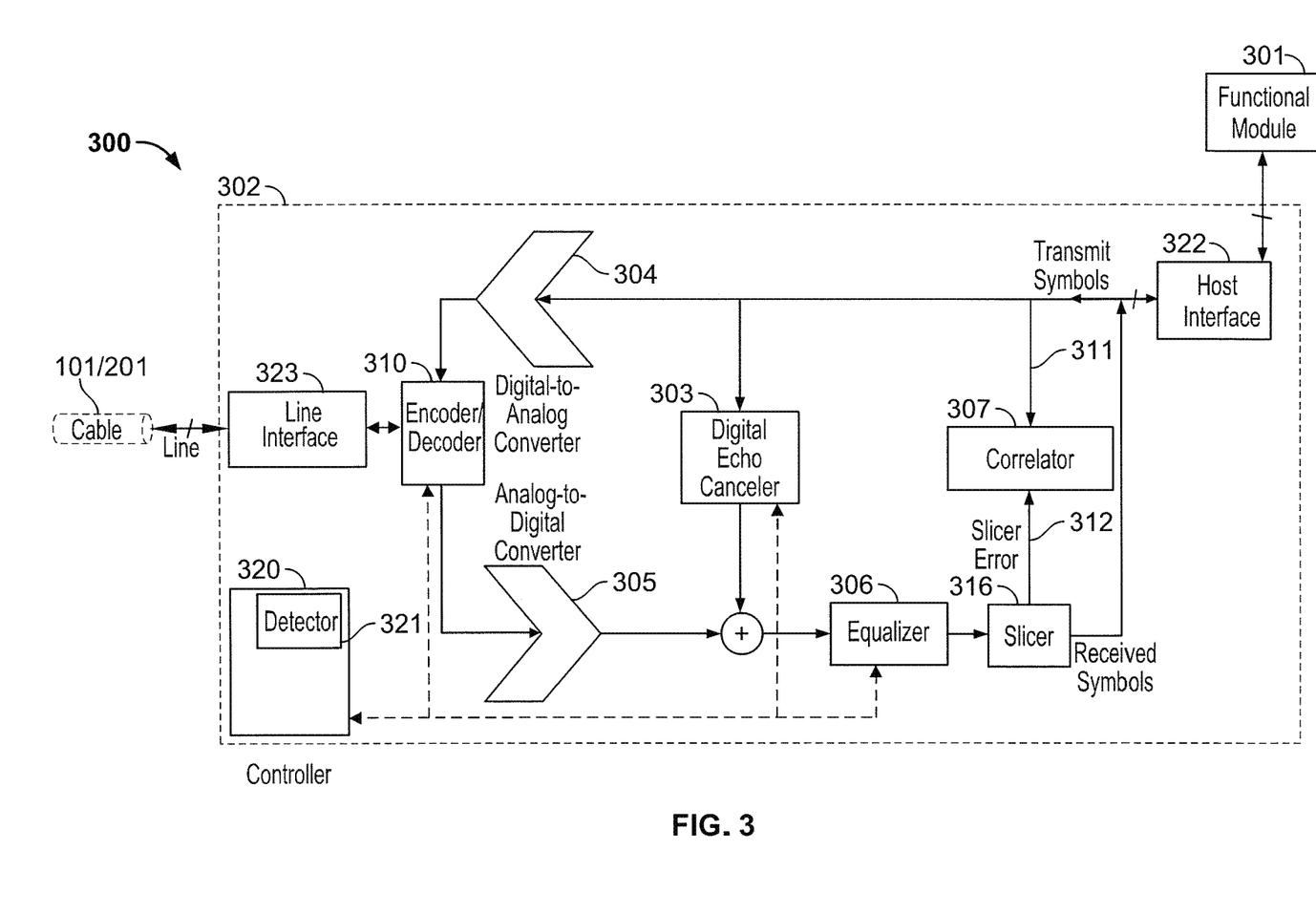
FIG. 3 is a modular diagram of a physical layer transceiver in accordance with implementations of the subject matter of this disclosure.

PHY 300 couples a host device, such as functional module 301, which may be an automotive module, or a data processing or storage module of an enterprise system, to wireline channel medium (cable) 101/201, using encoding and decoding circuitry 302. One or more of adaptive filters, shown as echo canceler(s) 303, but also potentially including NEXT canceler(s) and FEXT canceler(s), filter the effects of interference from echo and/or near-end crosstalk and/or far-end crosstalk, respectively.

In some implementations according to the subject matter of this disclosure, PHY 300 transmits data from functional module 301 through host interface 322 and digital-to-analog converter 304 via encoder/decoder 310 and line interface 322 onto wireline channel medium (cable) 101/201, and receives from wireline channel medium (cable) 101/201, via line interface 323 and encoder/decoder 310, through analog-to-digital converter 305 a remote (target) signal and an echo of the transmitted signal, which are processed through adaptive filter circuitry that may include digital echo canceler 303 and/or equalizer 306. Digital echo canceler 303 may be used to remove the echo, and may also include NEXT canceler(s) and FEXT canceler(s), to filter the effects of interference from echo and/or near-end crosstalk and/or far-end crosstalk, respectively. Equalizer 306 is used to enhance the quality of the remote signal.

Either or both of adaptive filters 303 (whether echo canceler(s), NEXT canceler(s) or FEXT canceler(s) or any combination) 03 and equalizer 306 may be implemented as rover filters. Correlation 307 may be provided to adjust the programmable delay of each segment of rover filters 303, 306 to "advance" or "move" each rover filter segment to correspond to a respective channel segment. Controller 320, which may include detector circuitry 321, may adjust the filter configuration—including both the position and filter parameters of each segment—based on detected change in channel transmission conditions.

Figure 4:
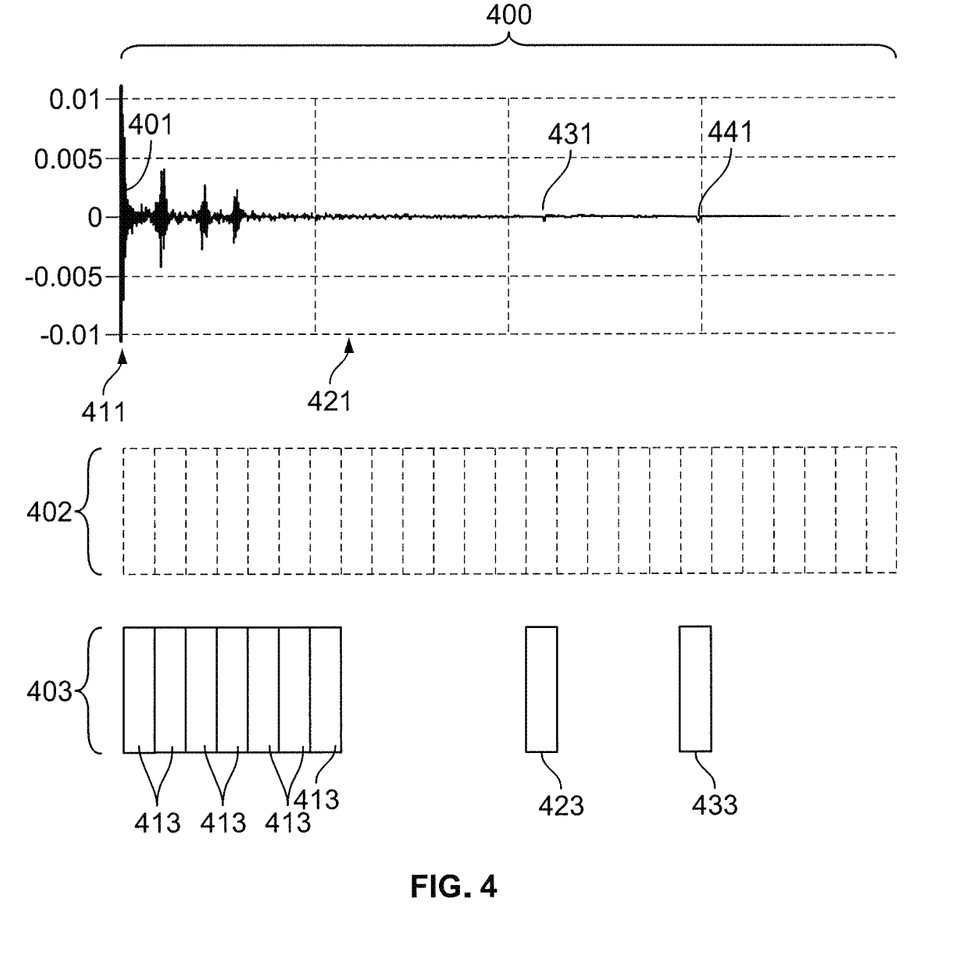
FIG. 4 shows the correspondence of respective filter segments to segments of a channel in accordance with implementations of the subject matter of this disclosure.

FIG. 4 shows the correspondence of respective filter segments to segments of a channel 400 in accordance with implementations of the subject matter of this disclosure. The impulse response of interference conditions on channel 400, which may include echo, crosstalk or a combination thereof, or other forms of interference, is shown at 401. In this illustration, interference conditions are worst near end 411, which may be adjacent to cable connectors, tailing off to near-zero at about point 421. The interference conditions would be expected to be high again at the far end (not shown) of channel 400. The majority of channel 400, from point 421 to a comparable point (not shown) near the other end of channel 400, can be expected to be relatively quiet from an interference perspective, with the exception of small peaks 431, 441 that may represent, for example and without limitation, kinks or bends in the physical channel medium (e.g., a coaxial, STP or UTP cable), or a connector.

Slots 402 represent locations to which filter segments may be assigned, corresponding to physical segments of the channel medium. As noted above, in the case of a rover filter implementation, respective rover filter segments may be "advanced" or "moved" to various ones of slots 402 by adjusting a respective programmable delay line. Thus, rather than filling every slot 402 with a filter segment, which would result in an overdesigned implementation with excessive power consumption, rover filter segments can be selectively assigned to ones of filter slots 402 corresponding to channel segments requiring filtering, while other slots 402 are left without a filter segment.

For example, an arrangement 403 of active rover filter segments might be deployed to deal with the interference having the impulse profile seen at 401. In arrangement 403, most filter segments 413 are concentrated to correspond to the end of the channel, where echo or other interference from connectors is present. Additional active rover filter segments 423, 433 are deployed to correspond to peaks 431, 441.

Arrangement 403 might represent a rover filter configuration established when the channel link is established. That is, where slots 402 shown in broken line indicate potential locations of rover filters, the segments 403 shown in solid line represent locations where active rover filter segments are deployed. In accordance with implementations of the subject matter of this disclosure, channel conditions continue to be monitored (as described above and in more detail below) and, if a change in interference patterns is detected, arrangement 403 may be modified to filter the changed interference.

For example, if an additional interference peak 501 (FIG. 5) appears (because, e.g., of mechanical effects as a cable moves as an automobile traverses a rough road surface, or thermal effects if the cable is subject to temperature fluctuations because of weather conditions), an additional rover filter segment 502 can be deployed to correspond to the location of the new peak 501, either in place of, or in addition to, any filter that may (or may not) already be filtering that location (as discussed further below). This assumes that unused rover filter segments are available. If no unused rover filter segments are available, it may be necessary to move a rover filter segment that was previously used elsewhere, where interference is less severe than at peak 501.

Figure 5:
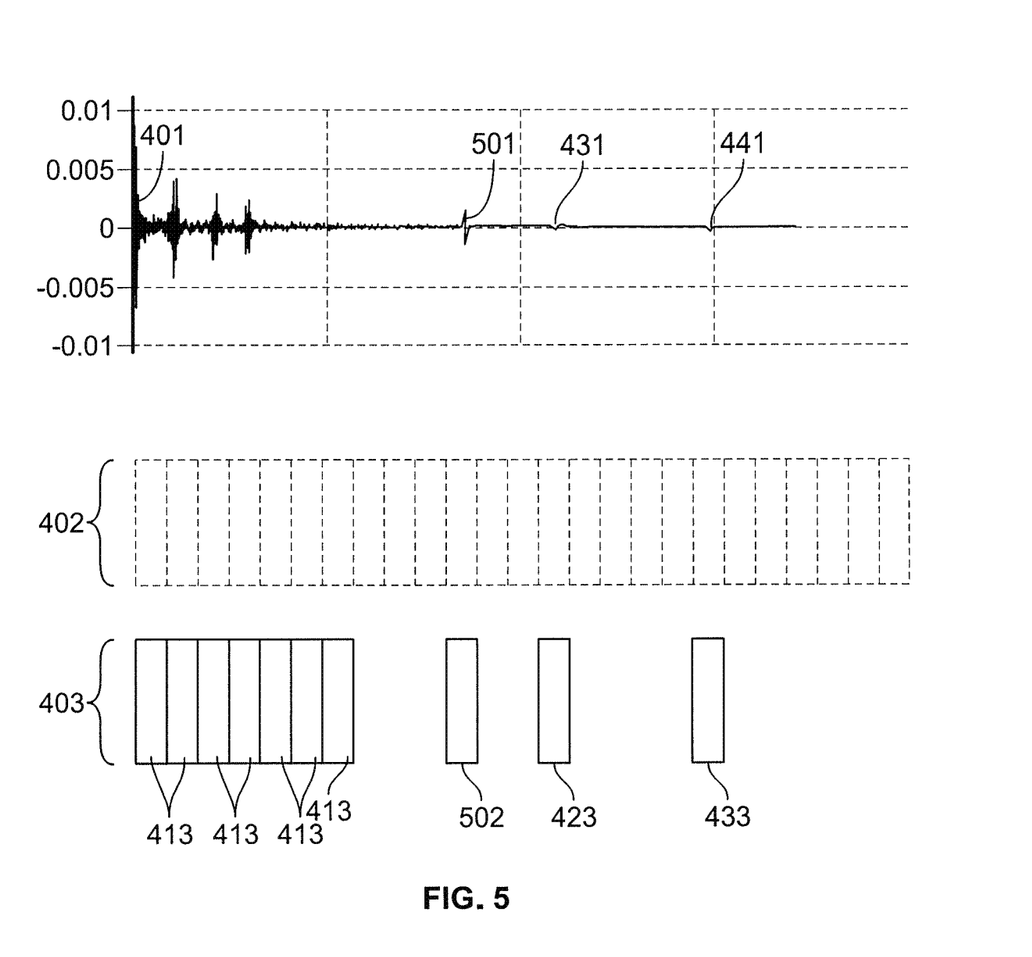
FIG. 5 shows the channel of FIG. 4 with additional interference.

Changing environmental conditions can also have the opposite effect. That is, changing mechanical or temperature conditions could cause a reduction in interference at a channel segment. In such a situation, it may be necessary to modify arrangement 403 by removing, rather than adding, a rover filter segment.

In addition to the foregoing more extreme changes in conditions that lead to removal of a rover filter segment where one had previously been deployed, or addition of a rover filter segment at a channel segment location to which a filter segment had not previously been deployed, many changes in environmental conditions result in the need to either increase or decrease the gain or other parameters of a particular existing rover filter segment. In some situations, it may be possible to adjust the gain or other parameters of the existing filter segment while leaving it in place. However, such an adjustment operation may not be possible if the resolution and/or range of the existing rover filter segment is not sufficient to accommodate the required adjustment. Even where adjustment is possible, care should be taken not to make an adjustment too abruptly, which can result in discontinuities in transmitted signals, but rather to make the adjustment gradually.

In alternative implementations, channel 400 can be filtered by a single filter, represented as filter 402 showing all of the individual channel segments filtered by the single filter 402. In such implementations, it may be determined that particular ones of the segments filtered by filter 402 require additional or enhanced filtering. If so, although a single filter is used for the entire channel 400, rover filter segments may be made available and advanced to particular channel segments filtered by filter 402 to increase or enhance filtering at those particular channel segments. In such implementations, arrangement 403 represents where such rover filter segments 413, 423, 433 are deployed for such additional filtering that is additive to the filtering provided by filter 402.

In accordance with implementations of the subject matter of this invention, where adjustment of the existing rover filter segment corresponding to a channel segment location is required, but not feasible, the gain or other parameters of a rover filter segment corresponding to a particular channel segment may be achieved by moving a new rover filter segment to correspond to the channel segment, and then removing the original rover filter segment from its correspondence with that location. To prevent discontinuities in the filtered signal, the parameters of the existing rover filter segment may be reduced gradually (e.g., the filter may be placed in a state in which it decays by leakage), while the new rover filter segment is allowed to adapt naturally.

Figure 6:
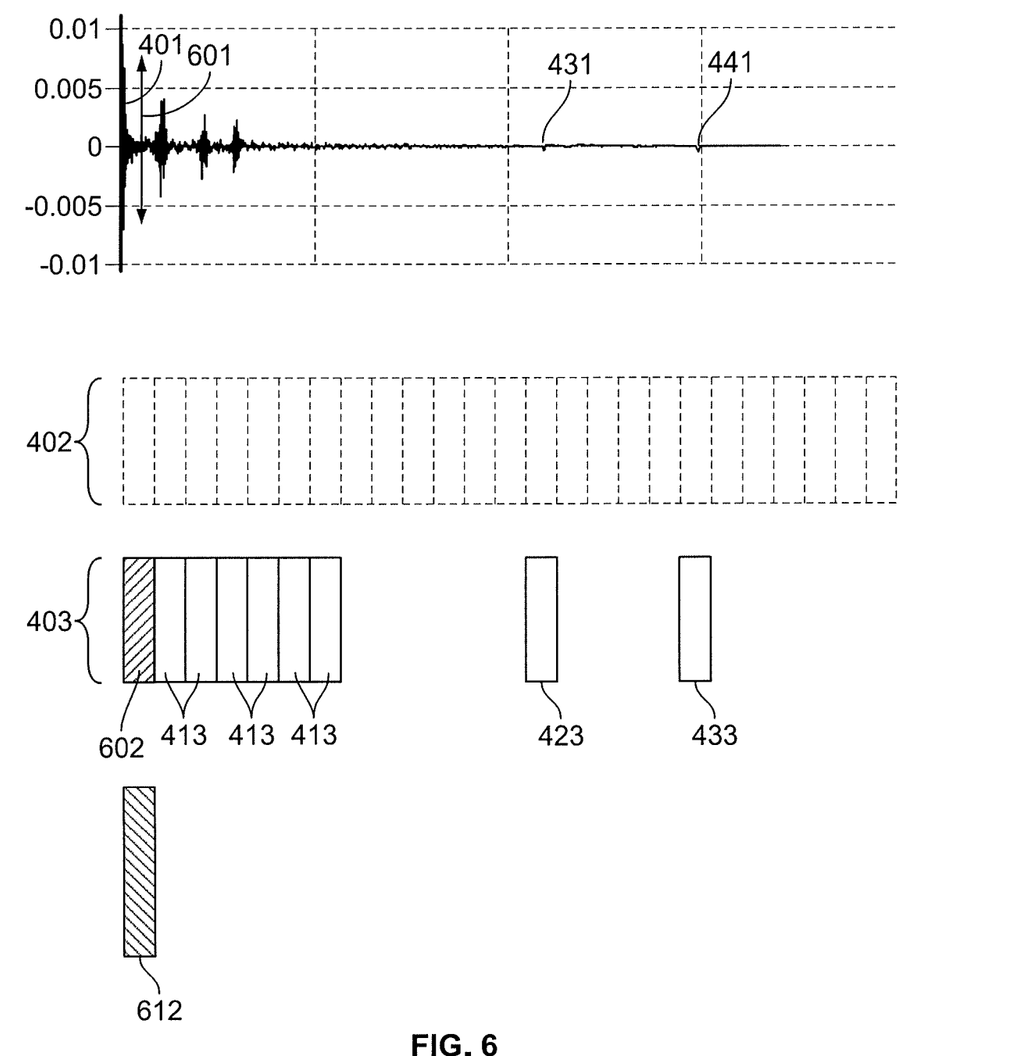
FIG. 6 shows the replacement of one filter segment with another in accordance with implementations of the subject matter of this disclosure.
Figure 7:
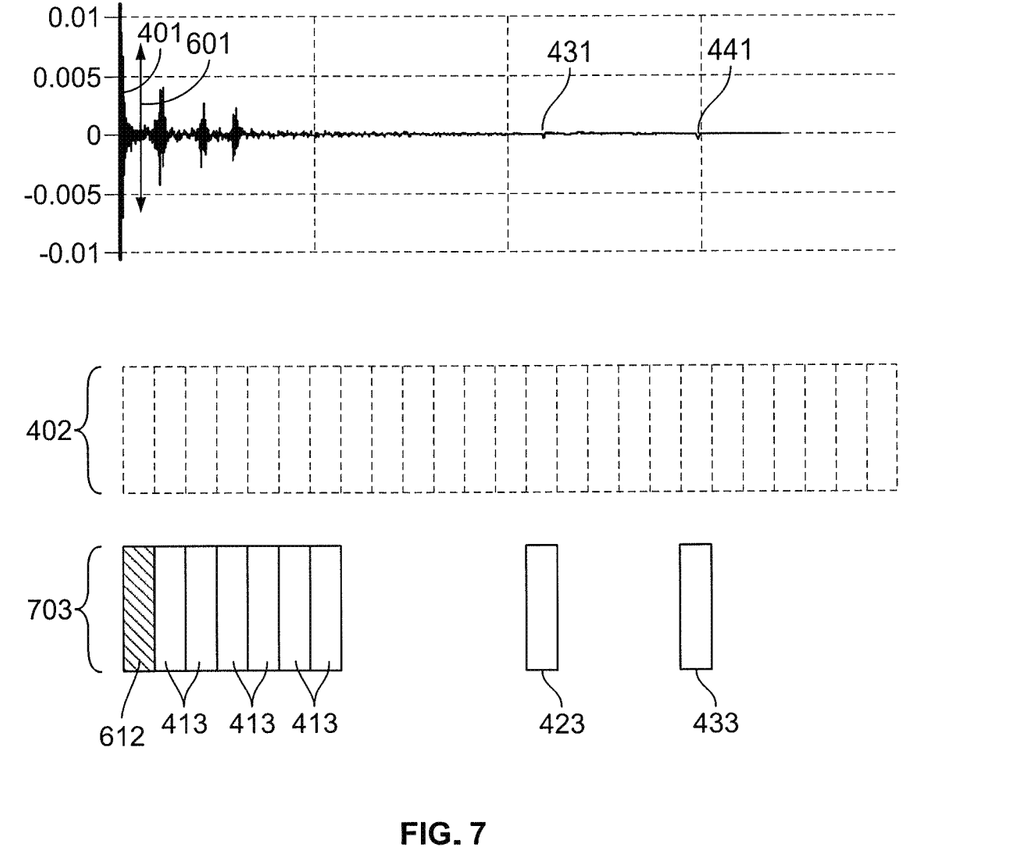
FIG. 7 shows the resulting channel after the replacement shown in FIG. 6.

Such an implementation is diagrammed in FIG. 6, which is similar to FIG. 4. Arrow 601 shows where the interference in the channel has increased, requiring an increase in the gain or other parameters of rover filter segment 602. This increase is achieved in this implementation by moving a new rover filter segment 612 into position. The higher filter parameters of rover filter segment 612 relative to rover filter segment 602 is indicated graphically by the relative sizes of rover filter segment 602 and rover filter segment 612 as drawn. As noted above, to prevent discontinuities, once rover filter segment 612 has been moved into position, rover filter segment 602 can be decreased until it has been completely deactivated, while rover filter segment 612 is allowed to adapt, increasing until it reaches the required parameters. The final result is shown in FIG. 7, where filter configuration 403 is replaced by filter configuration 703 in which rover filter segment 612 has replaced rover filter segment 602, and filter parameters are no longer represented in the drawing by relative size. Alternatively, the filter characteristics of rover filter segment can be increased by simply moving rover filter segment 612 into place in parallel with rover filter segment 602, in which case FIG. 6 represents the final condition.

As discussed above, any change of a filter segment, whether by addition, removal, adjustment or replacement, results from detection of a change in transmission conditions on the channel medium. Whether such changed conditions result from mechanical influences or from temperature or other weather-related conditions, as discussed above, or from other influences (e.g., external electromagnetic interference), in implementations of the subject matter of this disclosure, changes in transmission conditions are detected indirectly from resulting interference effects.

In some implementations, the changed transmission conditions on the channel are detected by rover filter segments. If a rover filter segment is already deployed to correspond to a channel segment experiencing increased (or decreased) interference because of changed conditions, the rover filter segment will detect the change and can be replaced or adjusted as described above. For those channel segment locations to which a rover filter segment has not been deployed, an "additional," "extra," or "auxiliary" rover filter segment—i.e., a rover filter segment that is not deployed to a specific channel segment location—can be temporarily deployed (e.g., sequentially) to each channel segment location. Alternatively, the auxiliary rover filter segment can be temporarily deployed even to channel segments which are already filtered to test whether the existing filter segments are correct.

Figure 8:
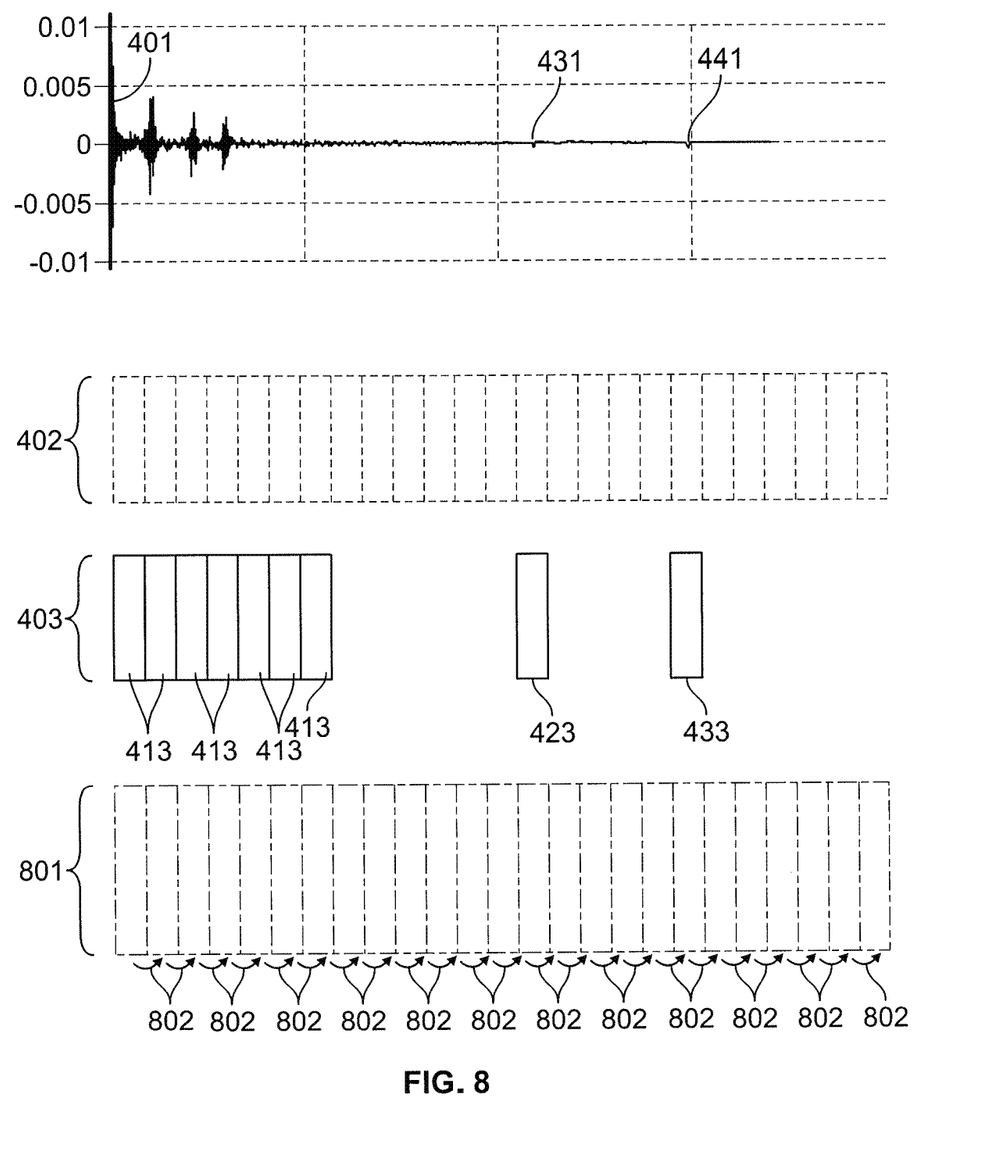
FIG. 8 illustrates a channel having a traveling auxiliary rover filter segment in accordance with implementations of the subject matter of this disclosure.

The "traveling" filter segment is depicted in FIG. 8, which is similar to FIG. 4, but in which the traveling filter segment 801 is represented by phantom filter segments, and arrows 802 indicate the "movement" of traveling filter segment 801. If interference is detected at an unfiltered channel segment location, a dedicated rover filter segment can be deployed to that channel segment location. If interference is detected at a filtered channel segment location, a new dedicated rover filter segment can be deployed to that channel segment location or the existing rover filter segment can be adjusted.

In some other implementations, the changed transmission conditions on the channel are detected by correlation. Correlator 307 in physical layer transceiver 300 may be used to perform correlation between the transmit signal 311 and the slicer error 312 derived by slicer 316 from the output of equalizer 306. The correlation output will indicate the delay and magnitude of uncanceled echo or crosstalk. A dedicated rover filter segment can be deployed to those channel segment locations at which uncanceled echo or crosstalk, as indicated by the correlation output, is larger than a certain threshold.

According to implementations of the subject matter of this disclosure, whether the presence of interference conditions at a channel segment is detected by an existing rover filter segment, by a traveling rover filter segment 801, or by correlator 307, after a dedicated rover filter segment has been deployed to that channel segment, then the quality metric (see above) at that channel segment with the dedicated filter in place can be compared to the quality metric at that channel segment before the dedicated filter was deployed. If the presence of the dedicated filter has not improved the quality metric, then the dedicated filter can be removed, returning to the previous condition.

Similarly, if a dedicated filter segment is removed based on a detected decrease in interference at a particular channel segment, then the quality metric at that channel segment without the dedicated filter in place can be compared to the quality metric at that channel segment before the dedicated filter was removed. If the removal of the dedicated filter has worsened the quality metric, then the dedicated filter can be restored to that channel segment, returning to the previous condition.

Figure 9:
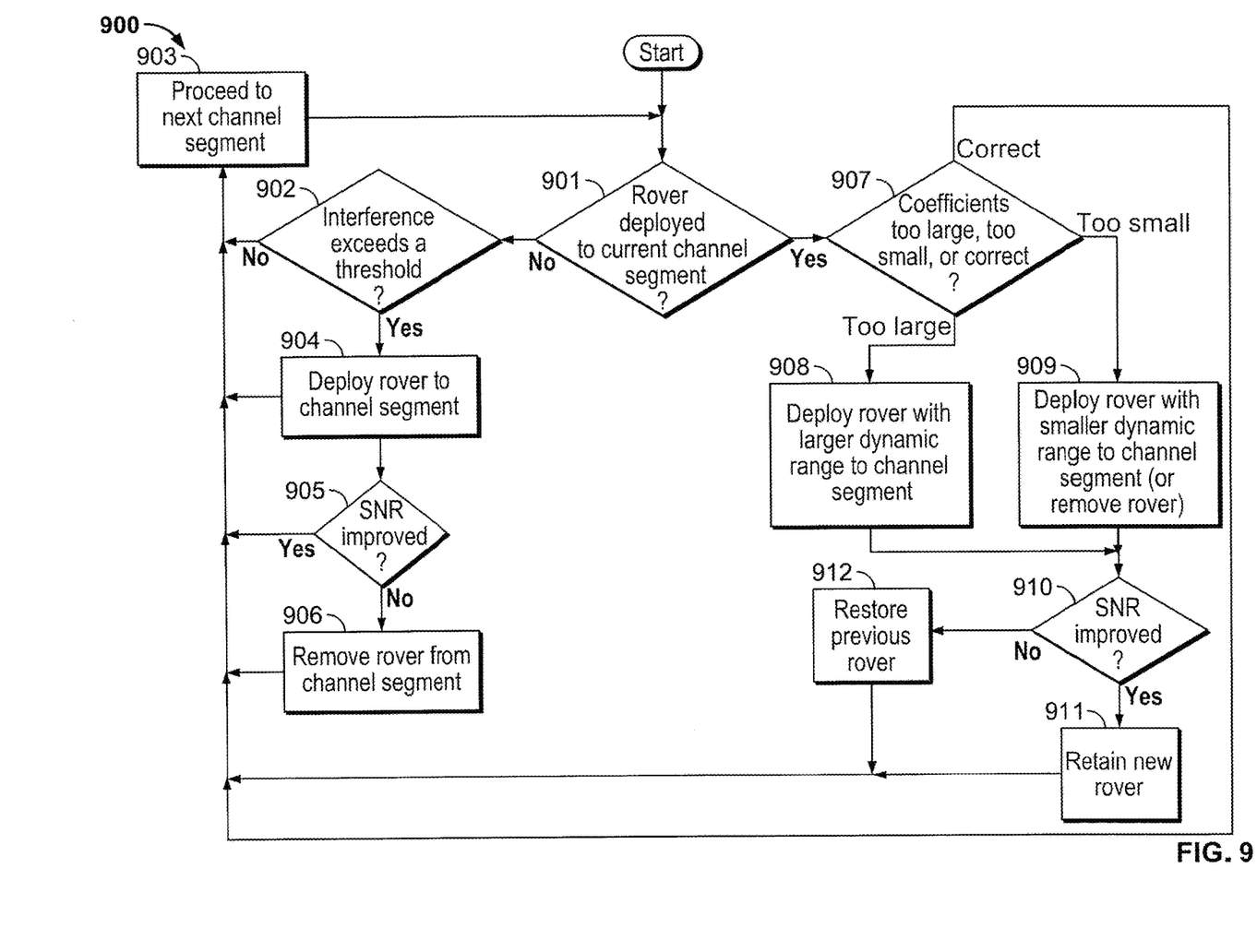
FIG. 9 is a flow diagram illustrating a method of operation in accordance with implementations of the subject matter of this disclosure.

The foregoing technique is diagrammed at 900 in FIG. 9 and begins at 901, where it is determined whether a rover filter segment is already deployed to the current channel segment. If not, then at 902 it is determined (e.g., by one of the detection techniques described above) whether interference at the current channel segment exceeds a predetermined threshold, based on a link quality metric as described above (e.g., SNR, bit error rate or decoder workload). If not, then at 903 testing proceeds to the next channel segment and flow returns to 901. If the current channel segment is an end segment, the "next" segment may the channel segment at the opposite end of the channel so that testing loops back and maintains the same direction, or the testing direction may change. However, the interval between successive occurrences of testing of a particular channel segment will be more uniform if the loopback approach is used.

If at 902 it is determined that interference at the current channel segment exceeds the threshold, then at 904 a rover filter segment is deployed to the current channel segment, and at 905 it is determined whether the signal-to-noise ratio has improved. If so, then at 903 testing proceeds to the next channel segment and flow returns to 901. But if at 905 it is determined that the signal-to-noise ratio has not improved, then at 906 the newly-deployed rover filter segment is removed (restoring the previous condition) before testing proceeds at 903 to the next channel segment and flow returns to 901.

If at 901 it is determined that a rover filter segment is already deployed to the current channel segment, then at 907 it is determined whether the coefficients of that rover filter segment are too large (i.e., so far above an expected range that the ability of the rover filter segment is trying so hard to correct the detected error that its ability to do so may be exceeded), too small (i.e., so far below an expected range that the rover filter segment may lack sufficient resolution to properly correct the detected error), or correct (i.e., within an expected range). If at 907 it is determined that the filter coefficients are correct, then at 903, testing proceeds to the next channel segment and flow returns to 901.

If at 907 it is determined that the filter coefficients are too large, meaning the ability of the rover filter segment to correct the detected error may be exceeded, then at 908 a rover filter segment with a larger dynamic range is deployed to the current channel segment. If at 907 it is determined that the filter coefficients are too small, meaning the rover filter segment may lack sufficient resolution to properly correct the detected error, then at 909 a rover filter segment with a smaller dynamic range is deployed to the current channel segment (which could include completely removing any rover filter segment from the channel segment in question). Whether a rover filter segment with a larger or smaller dynamic range is deployed, at 910 it is determined whether the signal-to-noise ratio is improved compared to the signal-to-noise ratio with the previous rover filter segment.

If at 910 the signal-to-noise ratio is improved compared to the signal-to-noise ratio with the previous rover filter segment, then at 911 the newly-deployed rover filter segment is maintained, and at 903 testing proceeds to the next channel segment and flow returns to 901. But if at 910 the signal-to-noise ratio is not improved compared to the signal-to-noise ratio with the previous rover filter segment, then at 9123 the previous rover filter segment is restored before testing proceeds at 903 to the next channel segment and flow returns to 901.

Thus it is seen that the adjustment of the configuration of filters in a high-speed data channel in response to environmental changes, during run-time, in the channel being filtered, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A physical layer transceiver for connecting a host device to a wireline channel medium having a cable length, the physical layer transceiver comprising:
   a host interface for coupling to a host device;
   a line interface for coupling to the wireline channel medium; and
   filter circuitry operatively coupled to the line interface, the filter circuitry comprising:
   a plurality of filter segments, fewer in number than a total number of link segments of the cable length of the wireline channel medium such that when all filter segments are active, fewer than the total number of link segments are filtered, respective individual filter segments in the plurality of filter segments being configurable to correspond to respective individual link segments of the total number of link segments, and being separately controllable from other filter segments in the plurality of filter segments, and
   control circuitry configured to:
   detect a change of transmission conditions in a particular link segment of the total number of link segments; and
   upon detection of the change of transmission conditions in the particular link segment of the total number of link segments, change a configuration of one of the plurality of filter segments to cause an alteration in filtering of signals in the particular link segment at which the change of transmission conditions is detected.

2. The physical layer transceiver of claim 1 wherein the control circuitry is configured to detect the change in transmission conditions in the particular link segment of the total number of link segments without using an active filter segment corresponding to the particular link segment of the total number of link segments or to an adjacent link segment of total number of link segments.

3. The physical layer transceiver of claim 1 wherein:
   the plurality of filter segments, fewer in number than the total number of link segments, comprises a plurality of rover filter segments each of which is selectably configurable to filter a respective link segment of the total number of link segments; and
   the control circuitry is configured to detect the change in transmission conditions in the particular link segment of the total number of link segments by selectively advancing an unused rover filter segment of the plurality of rover filter segments through the link segments, and to measure transmission conditions of each link segment of the total number of link segments as the unused rover filter segment passes through the link segments.

4. The physical layer transceiver of claim 1 comprising:
   correlation circuitry configured to calculate a correlation between transmitted data and one or more errors in received data; wherein:
   the control circuitry is configured to detect, from the correlation, the change in transmission conditions in the particular link segment of the total number of link segments.

5. The physical layer transceiver of claim 1 wherein the control circuitry is configured to, upon detection of the change in transmission conditions in the particular segment of the total number of link segments, change the configuration of the one of the plurality of filter segments to cause the alteration in filtering of signals in the particular segment at which the change in transmission conditions is detected by adjusting output gain of the one of the plurality of filter segments.

6. The physical layer transceiver of claim 5 wherein the control circuitry is configured to adjust output gain of the one of the plurality of filter segments by adding another filter segment in parallel with a current filter segment.

7. The physical layer transceiver of claim 5 wherein the control circuitry is configured to adjust output gain of the one of the plurality of filter segments by substituting, for a current filter segment, another filter segment with a different gain.

8. The physical layer transceiver of claim 7 wherein:
   the plurality of filter segments, fewer in number than the total number of link segments, comprises a plurality of rover filter segments; and
   the control circuitry is configured to substitute, for a current rover filter segment, another filter segment with a different gain by:
   advancing an unused one of the rover filter segments to filter the particular link segment of the total number of link segments,
   increasing gain of the unused one of the rover filter segments while decreasing gain of the current rover filter segment, and
   when gain of the current rover filter segment reaches zero, removing the current rover filter segment from its correspondence to the particular link segment of the total number of link segments.

9. The physical layer transceiver of claim 1 wherein:
   the plurality of filter segments, fewer in number than the total number of link segments, comprises a plurality of rover filter segments each of which is selectably configurable to filter a respective link segment of the total number of link segments; and
   the control circuitry is configured to, upon detection of the change in transmission conditions in the particular link segment of the total number of link segments, change the configuration of the one of the plurality of filter segments to cause the alteration in filtering of signals in the particular link segment at which the change in transmission conditions is detected by advancing an unused one of the rover filter segments to filter the particular link segment of the total number of link segments.

10. The physical layer transceiver of claim 1 wherein:
    the plurality of filter segments, fewer in number than the total number of link segments, comprises a plurality of rover filter segments each of which is selectably configurable to filter a respective link segment of the total number of link segments; and
    the control circuitry is configured to, upon detection of the interference event in the particular link segment of the total number of link segments, change the configuration of the one of the plurality of filter segments to cause the alteration in filtering of signals in the particular link segment at which the change in transmission conditions is detected by removing one of the rover filter segments that filters the particular one of the plurality of link segments at which the change in transmission conditions is detected from its position filtering the particular link segment of the total number of link segments.

11. A method of filtering a wireline channel medium having a cable length, and having filter circuitry including a plurality of filter segments, fewer in number than a total number of link segments of the cable length of the wireline channel medium such that when all filter segments are active, fewer than the total number of link segments are filtered, each filter segment in the plurality of filter segments being selectably configurable to correspond to one link segment of the total number of link segments, and being separately controllable from each other filter segment in the plurality of filter segments, the method comprising:
 detecting a change in transmission conditions in a particular link segment of the total number of link segments; and
 upon detection of the change in transmission conditions in the particular link segment of the total number of link segments, changing a configuration of one of the plurality of filter segments to cause an alteration in filtering of signals in the particular segment of the total number of segments of the cable length of the wireline channel medium.

12. The method of filtering a wireline channel medium according to claim 11 wherein detecting the change in transmission conditions in the particular link segment of the total number of link segments is performed without using an active filter segment corresponding or adjacent to the particular segment of the total number of segments of the cable length of the wireline channel medium.

13. The method of filtering a wireline channel medium according to claim 11, the plurality of filter segments, fewer in number than the total number of segments of the cable length of the wireline channel medium, including a plurality of rover filter segments each of which is selectably configurable to filter a respective link segment of the total number of link segments, wherein:
 detecting the change in transmission conditions in the particular link segment of the total number of link segments comprises advancing an unused rover filter segment of the plurality of rover filter segments through the link segments of the wireline channel medium, and measuring conditions of each link segment of the wireline channel medium as the unused rover filter segment passes through the link segments of the wireline channel medium.

14. The method of filtering a wireline channel medium according to claim 11, the filter circuitry including correlation circuitry configured to calculate a correlation between transmitted data and one or more errors in received data, wherein:
 detecting the change in transmission conditions in the particular link segment of the total number of link segments comprises detecting, from the correlation, the change in transmission conditions in the particular link segment of the total number of link segments of the wireline channel medium.

15. The method of filtering a wireline channel medium according to claim 11 wherein changing the configuration of the one of the plurality of filter segments to cause the alteration in filtering of signals in the particular link segment of the total number of link segments comprises adjusting output gain of the one of the plurality of filter segments.

16. The method of filtering a wireline channel medium according to claim 15 wherein adjusting the output gain of the one of the plurality of filter segments comprises adding another filter segment in parallel with a current filter segment.

17. The method of filtering a wireline channel medium according to claim 15 wherein adjusting the output gain of the one of the plurality of filter segments comprises substituting, for a current filter segment, another filter segment with a different gain.

18. The method of filtering a wireline channel medium according to claim 17, the plurality of filter segments, fewer in number than the total number of link segments, including a plurality of rover filter segments each of which is selectably configurable to filter a respective link segment of the total number of link segments, wherein substituting, for a current filter segment, another filter segment with a different gain, comprises:
 advancing an unused one of the rover filter segments to filter the particular link segment of the total number of link segments;
 increasing gain of the unused one of the rover filter segments while decreasing gain of the current rover filter segment; and
 when gain of the current rover filter segment reaches zero, removing the current rover filter segment from its position corresponding to the particular link segment of the total number of link segments.

19. The method of filtering a wireline channel medium according to claim 11, the plurality of filter segments, fewer in number than the total number of link segments, including a plurality of rover filter segments each of which is selectably configurable to filter a respective link segment of the total number of link segments, wherein:
 changing the configuration of one of the plurality of filter segments to cause the alteration in filtering of signals in the particular link segment of the total number of link segments comprises advancing an unused one of the rover filter segments to filter the particular link segment of the total number of link segments.

20. The method of filtering a wireline channel medium according to claim 11, the plurality of filter segments, fewer in number than the total number of link segments, including a plurality of rover filter segments each of which is selectably configurable to filter a respective link segment of the total number of link segments, wherein:
 changing the configuration of the one of the plurality of filter segments to cause the alteration in filtering of signals in the particular link segment of the total number of link segments comprises removing one of the rover filter segments that filters the particular link segment of the total number of link segments from its position filtering the particular link segment of the total number of link segments.

21. A method of filtering a wireline channel medium having a cable length, and having filter circuitry including a plurality of filter segments, fewer in number than a total number of link segments of the cable length of the wireline channel medium, each filter segment in the plurality of filter segments being selectably configurable to correspond to one link segment of the total number of link segments, and being separately controllable from each other filter segment in the plurality of filter segments, the method comprising, for each filter segment location:
 examining whether filter coefficients of a current filter segment have an expected value and, when the filter coefficients have other than the expected value, substituting a new filter segment with a different dynamic range, to bring the filter coefficients to the expected value, and determining whether signal quality improves;
 when signal quality improves after substitution, retaining the new filter segment, and removing the current filter segment;
 when signal quality does not improve after substitution, retaining the current filter segment, and removing the new filter segment; and
 advancing to a next filter segment location.

22. The method of claim 21 wherein determining whether signal quality improves comprises measuring at least one of signal-to-noise ratio, bit error rate, and decoder workload.

23. A physical layer transceiver for connecting a host device to a wireline channel medium having a cable length, the physical layer transceiver comprising:
- a host interface for coupling to a host device;
- a line interface for coupling to the wireline channel medium; and
- filter circuitry operatively coupled to the line interface, the filter circuitry comprising:
- a channel filter configured to filter all of the cable length of the wireline channel medium;
- a plurality of additional filter segments, respective individual ones of the additional filter segments in the plurality of filter segments being rover filter segments that are configurable to selectably correspond to respective individual link segments of the total number of link segments, and being separately controllable from other filter segments in the plurality of filter segments; and
- control circuitry configured to:
- detect a change of transmission conditions in a particular link segment of the total number of link segments; and
- upon detection of the change of transmission conditions in the particular link segment of the total number of link segments, configure an individual one of the plurality of additional filter segments to correspond to, and to filter, the particular link segment at which the change of transmission conditions is detected.

\* \* \* \* \*